F. M. BALDWIN.
SIGNALING DEVICE.
APPLICATION FILED DEC. 12, 1921.
1,438,010.
Patented Dec. 5, 1922.
2 SHEETS—SHEET 1.
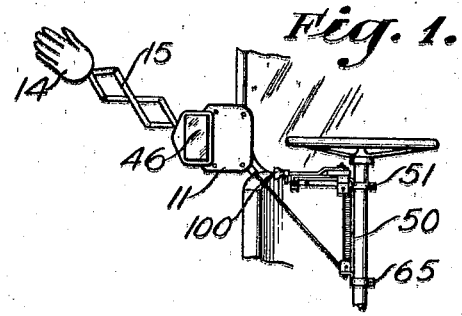
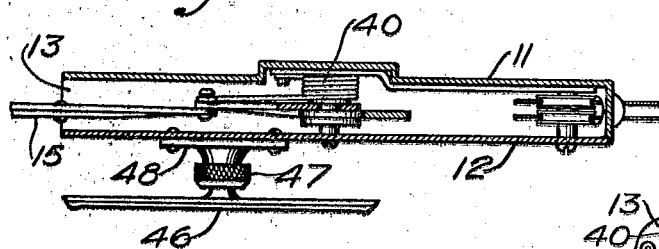
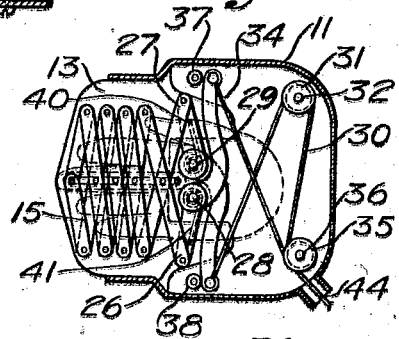
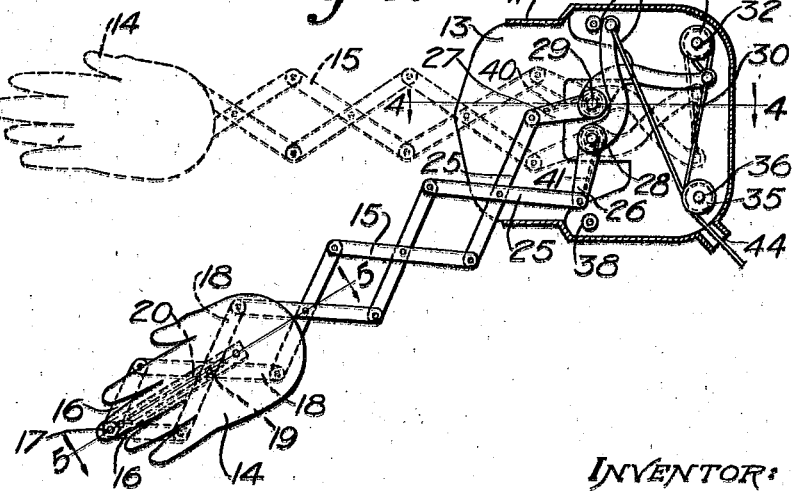
INVENTOR:
FREDERICK M. BALDWIN,
BY
Graham and Harris
ATTORNEYS.

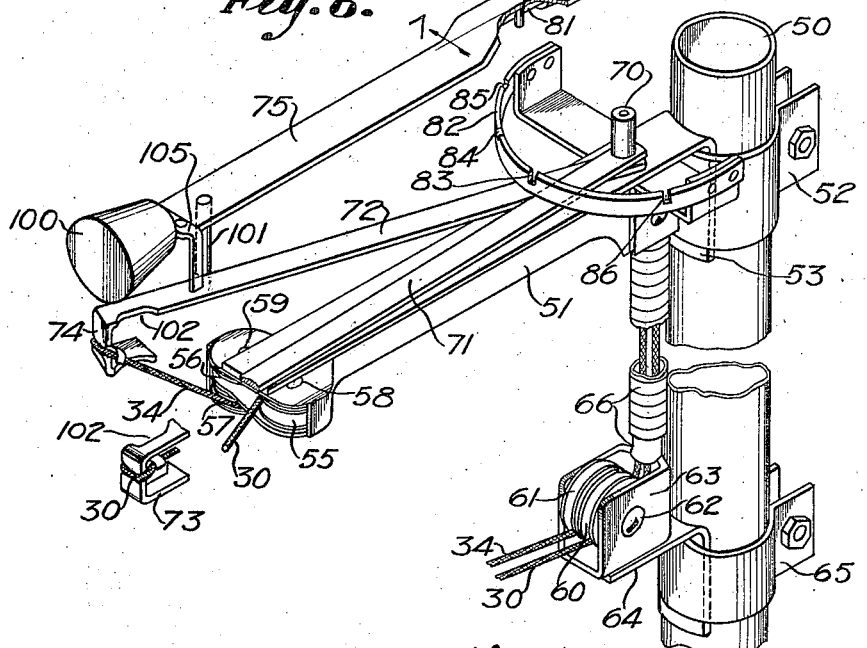

Patented Dec. 5, 1922.

1,438,010

UNITED STATES PATENT OFFICE.

FREDERICK M. BALDWIN, OF LOS ANGELES, CALIFORNIA.

SIGNALING DEVICE.

Application filed December 12, 1921. Serial No. 521,726.

*To all whom it may concern:*

Be it known that I, FREDERICK M. BALDWIN, a citizen of the United States, residing at Los Angeles, in the county of Los Angeles, State of California, have invented a new and useful Signaling Device, of which the following is a specification.

My invention relates to signaling devices such as are used on automobiles for the purpose of indicating the movement of the automobile carrying such device, being more particularly the type of signaling device in which a display, preferably in the form of a hand, is operated from the side of the car to indicate that the car is about to stop or turn to the right or the left.

The principal object of my invention is to produce a signaling device of the character described, of simple form and construction, which may be readily attached to the automobile and easily operated from the driver's seat.

Referring to the drawings, which are for illustrative purposes only,

Fig. 1 is a face view of the signaling device, showing the same mounted upon an automobile and the display in extended position.

Fig. 2 is an enlarged face view of the display portion of the signal, showing the same in collapsed or concealed position.

Fig. 3 is a view similar to Fig. 2, showing the display in extended position.

Fig. 4 is a sectional plan view on line 4—4, Fig. 3.

Fig. 5 is a sectional plan view on line 5—5, Fig. 3.

Fig. 6 is a perspective view, partly in section, of the operating device for the signal, the parts being separated to more clearly illustrate the construction of the same.

Fig. 7 is a sectional elevation on line 7—7, Fig. 6.

Fig. 8 is a perspective view of the operating rod and arms in the position assumed for the purpose of moving the signaling device horizontally, and Fig. 9 is a diagrammatic plan view of the controlling arms showing their relation to engaging portions of the operating rod.

The display apparatus consists of a sheet metal case or box 11 which may be mounted on the windshield or any other convenient part of the automobile in any approved manner. The case 11 is provided with a cover plate 12, the outer side or edge of the case being open, as indicated at 13, to permit the display member to move freely into and out of the case.

The display member, in the form shown, consists of a plate 14 shaped to resemble a hand, such hand being mounted upon lazy tongs indicated at 15, such lazy tongs terminating at their outer end in two short links 16, the ends of which are pivotally mounted on a pin or bolt 17 on the hand 14. The next links 18 are pivotally connected together, a pin 19 forming such pivot, the pin 19 being slidably mounted in a guide 20 secured to the back of the hand 14. The inner set of links 25 forming the lazy tongs are pivotally mounted at their inner ends to the short arms of bell crank levers 26 and 27. The bell crank levers 26 and 27 are pivotally mounted upon pins or stud bolts 28 and 29 respectively, such pins being supported in the case 11. Fastened to the long arm of the lever 27, is a cable 30 which passes over a pulley 31 mounted on a pin 32 in the case 11 and the long arm of the lever 26 is connected to a cable 34 which operates over a pulley 35 mounted upon a pin 36 in the case 11. Stops are provided to limit the movement of arms 26 and 27, a stop 37 being provided for the arm 26 and a stop 38 being provided for the arm 27.

Tension means are provided in the case to elastically hold the display in retracted or concealed position which consist of coiled springs 40 and 41 which are mounted upon the pins or shafts 29 and 28 respectively, the free end of such springs engaging the outer end of the short arm of levers 27 and 26 respectively, the spring 40 being clearly illustrated in Fig. 4 and spring 41 being of the same construction and indicated in dotted lines in Fig. 2. The cords or cables 30 and 34 pass from the case 11 through an opening 44.

The signaling or display apparatus may be operated by a manipulation of the cords or cables 30 and 34 in the following manner:

Under normal conditions, the lazy tongs are in collapsed position shown in Fig. 2 with the hand or display within the case, as indicated in dotted lines in Fig. 2. If the vehicle carrying the signal is about to turn, cable 30 is pulled which brings the bell crank lever 27 into the position shown in full lines in Fig. 3, this causes the lazy tongs to be extended into the full line position shown in Fig. 3, that is, outwardly and downwardly, due to the fact that the inner end of the lazy tongs connected to the lever 26 does not move, the movement to the lazy tongs being entirely imparted by the swinging of the bell crank 27. It will be understood that as the lazy tongs were extended, that the pin 19 on the lazy tongs slides in the guide 20 on the back of the hand thereby insuring proper alinement of the hand with the lazy tongs.

The action of pulling the cord 30 and moving the bell crank 26 into the position shown in full lines in Fig. 3 is against the spring 40, and a release of the cord 30 allows the spring to exert force against the short arm of the bell crank 27 and retract the lazy tongs into the original position.

In the event it is desired to move the hands into a horizontal position, both cords 30 and 34 are simultaneously pulled and the same coacting upon the long arms of the bell cranks 27 and 26 such bell cranks are moved simultaneously into the dotted line position shown in Fig. 3, thereby causing the lazy tongs to move in a horizontal direction as both bell cranks are given the same amount of movement. The display may be moved into the upper position shown in Fig. 1 by pulling the cable 34 which operates the bell crank 26 while the bell crank 27 remains stationary. Due to the fact that all of the movement in this instance is imparted to the lazy tongs by the bell crank 26, the hand is caused to move outwardly and upwardly in the position shown in Fig. 1, such arm being retracted in the same manner as heretofore described with respect to arm 27.

The placing of the case 11 upon the automobile and in position to extend outwardly therefrom, affords a convenient mounting for a rear sight mirror, as indicated at 46, which is preferably mounted upon a ball joint 47 upon a bracket 48 which is secured in any suitable manner to the cover plate 12.

While I have shown and described the display apparatus and have explained the operation of the same by manipulation of the cords or cables, I prefer to use a specific form of mechanism for such purpose.

50 designates a steering post to which is attached a bracket 51 by means of a clamp 52, the bracket 51 having a downwardly extending inner end 53 which is engaged between such clamp 52 and the steering post 50. In the outer end of the bracket 51 is a pulley 55 at one side of said bracket and pulleys 56 and 57 at the other side of said bracket. The pulley 55 is mounted upon a shaft 58 and the pulleys 56 and 57 are mounted one above another upon a shaft 59.

The cables 30 and 34, after leaving the case 11, pass around pulleys 60 and 61 respectively mounted upon a shaft or pin 62 in a pulley block 63 which is preferably swiveled to a bracket 64 clamped to the steering post 50 by means of a clamp 65. The cables 30 and 34 then extend upwardly through a flexible tube 66 and pass over pulleys 67 which are mounted in the inner end of the bracket 51, only one of such pulleys 67 being shown, the other being of the same size and directly behind the pulley 67, as shown in Fig. 7.

Mounted upon the bracket 51 and extending upwardly therefrom is a pin or stud bolt 70 upon which is pivotally mounted the inner ends of arms 71 and 72, the outer end of such arms being bent to form a hook, as shown at 73 and 74 respectively. The cable 30 is attached to the hook formed on the arm 71 and the cable 34 attached to the hook 74 on the arm 72, such arms being operated by means of an operating rod or lever 75.

This operating rod 75 is pivotally mounted upon the pin 70, such pin extending through an elongated opening 77 formed in the inner end of the lever 75, such elongated opening 77 having an extension or slot 78 which receives a pin 79 mounted in a block 80 which is secured to the bracket 51 by means of the pin 70. The lever 75 has a fin or web 81 which rides upon a segment 82 mounted upon the bracket 51, such segment having notches 83, 84, 85 and 86 formed in the upper face to receive a web 81, the operating rod being elastically held downwardly in engagement with such segment by means of a flat spring 90 mounted upon the pin 70, the lever 75 and the spring 90 being secured in place by means of a bolt 91, the head of which engages a washer 92 on the spring 90, the bolt extending into a threaded opening in the pin 70. The inner end of the spring 90 is provided with a slot 94 to clear the pin 79 when the operating rod is moved inwardly or outwardly as hereinafter described.

The outer end of the lever 75 is provided with a handle 100 by means of which the same may be easily operated. 101 designates a stud mounted upon the rod 85 and extending downwardly therefrom between the two arms 71 and 72, such arms being cut away, as indicated at 102, to receive such stud. The operating lever 75 is also provided with a finger 105 which, under certain operating conditions, is far enough away beyond the ends of the arms 71 and 72 to permit movement of the operating rod without the finger 105 coming into engagement with such arms, the operating rod, however, being movable inwardly for the purpose of bringing such finger in relation with the arms 71 and 72, as shown in Fig. 8. Such inward movement of the operating rod is against a coiled spring 110 mounted upon a rod 111 on the block 80, the outer end of the spring 110 being carried in a housing 112 which is fastened or secured to the underside of the lever 75.

When it is desired to operate the cable 30 for the purpose of moving the hand into the downward position shown in full lines in Fig. 3, the lever 75 is moved in the direction of the arrow 120 in Fig. 9. This movement of the lever 75 causes the stud 101 to engage with the arm 71, and move such arm 71 with the lever 75. The movement of the arm 71 causes the cable 30 to be pulled over the pulley 55, such movement exerting a pull on the bell crank 27, as heretofore described.

It will be understood that the rod may be retained at the end of such movement by engagement of the web 81 with the notch 86 in the segment 82. By moving the lever 75 to the central position, that is, with the web 81 in engagement with the notch 83, the arm 71 is returned to its original position by the pull exerted thereon by the cable 30.

When it is desired to move the hand into its upward position, the lever 75 is moved into the direction of the arrow 121, shown in Fig. 9, in which position the stud 101 engages the arm 72 and moves the same, thereby extending a pull on the cable 34. The web 81, in this case, engages the notch 85 in the segment 82 and thus is retained in such position.

A release of the lever 75 permits the arm 72 to return to its original position due to the pull of the cable 34 on the arm 72. When it is desired to move the hand straight outwardly in a horizontal direction, as shown in dotted lines in Fig. 3, the operating lever is first pushed inwardly toward the steering post until a pin 125 on such rod passes through the notch 83 to the inside of the segment 82 where, by a slight movement of the lever 75 in the direction of the arrow 121 in Fig. 9, such pin engages the inside of the segment and is elastically held thereagainst by the spring 110, the inward movement of the operating lever, thus directed, brings the finger 105 from the full line position shown in Fig. 9 to the dotted line position shown in such figure and when in such position, after the lever 75 is moved in the direction of the arrow 121, such finger engages the arm 71 and such arm engages the arm 72, both arms 71 and 72 being moved in the direction of the arrow 121. This causes a pull on both cables, cable 30 now operating over pulley 56, and an operation of both bell cranks 26 and 27, resulting in the hand moving in a horizontal position, as heretofore described.

A notch 84 is provided in the segment 82 to receive the web 81 when the operating lever has moved both arms 71 and 72, as heretofore described, and the lever 75 remains in such position until such web is released from the notch 84. It will be understood that when the operating lever 75 is returned to its central position, that the pin 125 will pass through the notch 84 in the segment 82 and thereby permit the operating rod to move outwardly thereby freeing the finger 105 from the engagement with the arm 71.

I claim as my invention:

1. An automobile signal comprising: a support; an extensible display member on said support consisting of lazy tongs, a pair of levers connected to the inner end of said lazy tongs, and means for operating one of said levers, independently of the other lever.

2. An automobile signal comprising: a support; an extensible display member on said support consisting of lazy tongs, a pair of levers connected to the inner end of said lazy tongs, means for operating one of said levers, and means for yieldingly holding the other lever against movement.

3. An automobile signal comprising: a support; an extensible display member on said support consisting of lazy tongs, a pair of levers connected to the inner end of said lazy tongs, a pivotal support for each lever, and means for operating one of said levers independently of the other lever.

4. An automobile signal comprising: a support; an extensible display member consisting of lazy tongs, a pair of levers connected to the inner end of said lazy tongs, means for limiting the movement of said levers in one direction, spring means for yieldingly holding said levers against said limiting means, and means for separately operating either of said levers independently of the other lever.

5. An automobile signal comprising: a support; an extensible display member consisting of lazy tongs, a pair of levers connected to the inner end of said lazy tongs, means for limiting the movement of said levers in one direction, spring means for yieldingly holding said levers against said limiting means, and means for operating said levers separately or simultaneously.

6. An automobile signal comprising: a support; an extensible display member consisting of lazy tongs, a pair of levers connected to the inner end of said lazy tongs, a pivotal support for each lever, means for limiting the movement of said levers in one direction, spring means for yieldingly holding said levers against said limiting means, and means for separately operating said levers.

7. An automobile signal comprising: a support; lazy tongs; a display consisting of a hand, a guide on said hand, a pair of short links on the outer end of said lazy tongs, a pin on said hand pivotally connecting the outer end of said short links, a pin pivotally connecting the next links, said pin extending into and slidably in said guide, and means for operating said lazy tongs.

8. In an automobile signal: a supporting member; an extensible display member consisting of lazy tongs; a pair of bell crank levers connected to the inner end of said lazy tongs, a flexible cable connected to each lever, and means for operating said cables separately or simultaneously.

9. In an automobile signal: a supporting member; an extensible display member consisting of lazy tongs, a pair of bell crank levers connected to the inner end of said tongs, an independent pivotal support for each lever, means for limiting the movement of said levers, an operating cable for each lever, and means for separately or simultaneously operating said cables.

10. In an automobile signal: a supporting member; an extensible display member consisting of lazy tongs, a pair of levers connected to the inner end of said lazy tongs and operating means for said levers consisting of a pair of pivotally mounted arms, separate cables connecting said arms and levers, and an operating rod arranged to separately or simultaneously operate said arms to extend said lazy tongs.

11. In an automobile signal: a supporting member; an extensible display member consisting of lazy tongs; a pair of levers connected to the inner end of said lazy tongs and operating means for said levers consisting of a pair of pivotally mounted arms, separate cables connecting said arms and levers, and an operating rod arranged to separately or simultaneously operate said arms to extend said lazy tongs, and spring means for returning said lazy tongs.

12. In an automobile signal: a supporting member; an extensible display member consisting of lazy tongs, a pair of levers connected to the inner end of said lazy tongs and operating means for said levers consisting of a pair of pivotally mounted arms, separate cables connecting said arms and levers, a pivotally mounted operating rod, and a stud on said rod extending between said arms.

In testimony whereof, I have hereunto set my hand at Los Angeles, California, this 2d day of December, 1921.

FREDERICK M. BALDWIN.